United States Patent [19]
Ansorge et al.

[11] Patent Number: 5,904,834
[45] Date of Patent: May 18, 1999

[54] SYNTHETIC WAX FOR FOOD APPLICATIONS

[75] Inventors: Joachim Ansorge, The Hague; Arend Hoek; Willem Pieter Leenhouts, both of Amsterdam; Robert Anthony John Priston, The Hague, all of Netherlands

[73] Assignee: Shell Research Limited, United Kingdom

[21] Appl. No.: 08/849,005

[22] PCT Filed: Oct. 24, 1995

[86] PCT No.: PCT/EP95/04194

§ 371 Date: Aug. 1, 1997

§ 102(e) Date: Aug. 1, 1997

[87] PCT Pub. No.: WO96/12778

PCT Pub. Date: May 2, 1996

[30] Foreign Application Priority Data

Oct. 24, 1994 [EP] European Pat. Off. .............. 94203098

[51] Int. Cl.⁶ ...................................................... C08L 91/06
[52] U.S. Cl. ................................ 208/24; 208/20; 208/27; 106/270
[58] Field of Search .................................. 208/27, 20, 24

[56] References Cited

U.S. PATENT DOCUMENTS

| | | | |
|---|---|---|---|
| 2,461,871 | 9/1949 | Luben | 260/450 |
| 3,028,931 | 9/1965 | Wood | 208/27 |
| 4,002,706 | 1/1977 | Pretorius | 208/21 |
| 4,148,711 | 4/1979 | Holder | 208/27 |
| 4,173,697 | 11/1979 | Gilbert | 526/74 |

*Primary Examiner*—Helane Myers

[57] ABSTRACT

The present invention relates to the use of wax for food applications, which wax has a congealing point of more than 65° C. and a Saybolt color of more than +25, which wax is obtainable by subjecting a wax prepared in a Fischer-Tropsch synthesis process to a hydrogenation treatment to prepare a hydrogenated wax containing less than 1.5% by weight of oxygenates, fractionating the hydrogenated wax to obtain a hydrogenated wax fraction having a desired congealing point, and subjecting the hydrogenated wax fraction to a hydrofinishing treatment. The present invention further relates a process for the preparation of a wax which comprises subjecting a wax prepared in a Fischer-Tropsch synthesis process to a hydrogenation treatment to prepare a hydrogenated wax containing less than 1.5% by weight of oxygenates, fractionating the hydrogenated wax to obtain a hydrogenated wax fraction having a desired congealing point, and subjecting the hydrogenated wax fraction to a hydrofinishing treatment. Moreover, the present invention relates to a wax suitable for use in food applications.

14 Claims, No Drawings

SYNTHETIC WAX FOR FOOD APPLICATIONS

The present invention relates to the use of a wax for direct or indirect food applications. In particular, the present invention relates to the use of wax for food applications, which wax has been prepared by the synthesis of heavy hydrocarbons from synthesis gas, using a Fischer-Tropsch catalyst.

Highly refined waxes which are currently used in for example packaging of food are conventionally prepared from crude oil. The most highly refined waxes, containing trace amounts of impurities such as aromatics are currently used for direct food applications, that is in applications in which the wax is in direct contact with the food.

It will be appreciated that stringent requirements are set by (inter)national regulatory authorities, such as the FDA in the United States, and the SCF in the European Union, which a wax should meet, particularly if the wax is to be used in direct contact with food. Further, it will be appreciated that it is a demanding task for the crude oil refiner to meet those requirements. Thus, the preparation of such waxes normally involves distillation at atmospheric pressure of a selected crude oil to prepare a heavy fraction called long residue, distillation of the long residue into various fractions, subjecting the desired fraction to (severe) hydrotreating, hydrogenation and/or hydrofinishing, and/or subjecting the desired fraction to a solvent extraction treatment, for example with N-methyl-pyrrolidone or furfural, subjecting the treated fraction to a solvent dewaxing step to produce slack wax from the treated fraction, subjecting the slack wax to a deoiling step, and treating the deoiled wax with an adsorbent, such as charcoal, to remove remaining impurities.

An alternative method for the preparation of waxes is by synthesis of heavy hydrocarbons from synthesis gas, that is a mixture of carbon monoxide and hydrogen, by passing the synthesis gas at elevated temperature and pressure over a catalyst having Fischer-Tropsch activity and refining the heavy hydrocarbons so produced. An advantage of this method is that the heavy hydrocarbons so produced contain fewer impurities and undesirable compounds than products prepared in the conventional way.

Whilst waxes currently on the market do meet very stringent requirements, it would be desirable if waxes could be provided which meet even higher requirements in terms of toxicity and even less possible damage to human or animal health.

Bioaccumulation in rodents is used by (inter)national Regulatory Authorities, such as the United States FDA, to predict potential for bioaccumulation in humans and other animals. To study bioaccumulation of waxes in rodents, a group of rodents is fed with a daily diet of wax, and after a standard period, the accumulation of wax in the body of the rodent is determined, in particular, the accumulation of wax in the liver. It is normal practice that where data exist from several rodent strains, the worst case is taken. The majority of biological experiments with waxes have been conducted in the Fischer 344 strain of rat. Although new test results using Sprague-Dawley rats have shown a lower accumulation, the most sensitive strain at this time is Fischer 344.

Therefore, an objective of the invention is to provide a wax which does not accumulate in Fischer 344 rats.

It has now been found that certain waxes prepared from heavy hydrocarbons produced in a Fischer-Tropsch synthesis process do not accumulate in Fischer 344 rats.

Therefore, the present invention relates to the use of wax for food applications, which wax has a congealing point of more than 65° C. and a Saybolt colour of at least +25, which wax is obtainable by subjecting a wax prepared in a Fischer-Tropsch synthesis process to a hydrogenation treatment to prepare a hydrogenated wax containing less than 1.5% by weight of oxygenates, fractionating the hydrogenated wax to obtain a hydrogenated wax fraction having a desired congealing point, and subjecting the hydrogenated wax fraction to a hydrofinishing treatment.

It has been found that waxes obtainable as indicated above, and having a congealing point of more than 65° C., substantially do not accumulate in Fischer 344 rats.

For the purposes of this specification, a wax that does not substantially accumulate in Fischer 344 rats is defined as wax which in a 90 day feeding study of powdered wax with female Fischer 344 rats, at a wax concentration of 2% by weight causes a liver weight increase relative to a control group of less than 15% by weight. It has been found that the liver weight increase relative to a control group is a very sensitive indicator for accumulation of waxes in the animal body.

Preferably, a wax is used having a congealing point of more than 75° C., preferably more than 85° C., more preferably more than 90° C., in particular, more than 95° C. It has been found that such waxes accumulate even less in the liver of Fischer 344 rats. It will be appreciated that a most suitable wax for direct food applications is a wax having a congealing point above 85° C., in particular above 90° C. or even above 95° C. Preferably, the accumulation in the liver of Fischer 344 rats is less than 10% by weight, preferably less than 8% by weight, at a wax concentration of 2% by weight, even more preferably statistically not significant, at a study group and control group size of 5 animals.

The wax to be used for (direct) food applications preferably should not have a congealing point which is more than 150° C. as such wax is difficult to handle. Accordingly, preferably, the wax has a congealing point of up to 150° C., more preferably up to 125° C., even more preferably up to 105° C.

It will be appreciated that the wax to be used for direct or indirect food applications should be colourless, primarily in view of health reasons. The presence of minute amounts of components which induce a yellowish, or even brownish, colour to the wax is undesirable as in particular those (polyaromatic) components may present considerable health risks. Thus, typically, the wax has a Saybolt colour of more than 25, preferably at least 27, more preferably at least 28, in particular at least 30. A Saybolt colour of at least 30 means that in molten state the wax is water-white. The Saybolt colour is a well-known parameter to those skilled in the art and can suitably be determined by a standard method known to those skilled in the art.

According to the invention, a wax is used which is obtainable by subjecting a wax prepared in a Fischer-Tropsch synthesis process to a hydrogenation treatment to prepare a hydrogenated wax containing less than 1.5% by weight of oxygenates, fractionating the hydrogenated wax to obtain a hydrogenated wax fraction having a desired congealing point, and subjecting the hydrogenated wax fraction to a hydrofinishing treatment. It has been found that such wax combines an excellent Saybolt colour, with an excellent Saybolt colour stability and substantially no or no accumulation of wax in Fischer 344 rats.

It will be appreciated that preferably a wax is used having the same characteristics as a wax prepared by a process as hereinabove defined. However, it will be appreciated that other methods of preparation may be possible and waxes having the same characteristics as a wax prepared by a process as defined hereinabove, but obtained by a modified process are considered to be within the scope of the present invention. In particular, it is contemplated that it is also possible to prepare a wax within the scope of the present invention by partly or fully substituting the hydrofinishing treatment by a charcoal or active carbon treatment. A disadvantage of a charcoal or active carbon treatment, however, is that it produces an appreciable quantity of chemical waste. In a particularly preferred embodiment of the present invention, a wax is used which is obtained by a process as described hereinafter.

According to a further aspect of the invention, the wax, for use in food applications, consists almost entirely of paraffins, and typically comprises at least 70% by weight of normal paraffins, preferably at least 80% by weight, more preferably at least 85% by weight. The weight percentage of normal paraffins in a wax is typically determined by NMR. The oil content of the wax is typically less than 3% by weight, preferably less than 1% by weight, more preferably less than 0.5% by weight.

According to a further aspect of the invention, the carbon chain length distribution of hydrocarbons in the wax is such that less than 5% by weight of the wax has a carbon chain length below $C_{25}$, preferably, less than 5% by weight has a carbon chain length below $C_{28}$, more preferably less than 2% by weight has a carbon chain length below $C_{28}$.

In a further aspect of the invention, the present invention relates to a process for the preparation of a wax suitable for use in (direct) food applications which comprises subjecting a wax prepared in a Fischer-Tropsch synthesis process to a hydrogenation treatment to prepare a hydrogenated wax containing less than 1.5% by weight of oxygenates, fractionating the hydrogenated wax to obtain a hydrogenated wax having a desired congealing point, and subjecting the fractionated hydrogenated wax to a hydrofinishing treatment.

The wax prepared in a Fischer-Tropsch synthesis process is typically highly paraffinic, that is, typically contains at least 80% by weight of paraffinic hydrocarbons, preferably at least 90% by weight.

Fischer-Tropsch synthesis processes are known in the art. A typical process involves reacting hydrogen and carbon monoxide at elevated temperature and pressure in the presence of a catalyst active in the synthesis of paraffinic hydrocarbons. The relative amounts of carbon monoxide and hydrogen present in the feed may vary over a wide range and may be selected according to the precise catalyst and process operating conditions being employed. Typically, the feed contacting the catalyst comprises carbon monoxide and hydrogen in a hydrogen/carbon monoxide molar ratio of below 2.5, preferably below 1.75. Preferably, the hydrogen/carbon monoxide molar ratio is at least 0.4. Unconverted carbon monoxide and hydrogen may be separated from the synthesis product and recycled to the inlet of the synthesis reactor.

Suitable catalysts for use in the synthesis of paraffinic hydrocarbons are known in the art. Typically, the catalyst comprises, as the catalytically active component, a metal from Group VIII of the Periodic Table of Elements. Particular catalytically active metals from Group VIII include ruthenium, iron, cobalt and nickel. A catalyst comprising cobalt as the catalytically active metal is preferred inter alia as such catalyst is capable of producing highly paraffinic waxes in high yields.

The catalytically active metal is preferably supported on a porous carrier. The porous carrier may be selected from any suitable refractory metal oxide or silicate or mixture thereof. Particular examples of preferred carriers include silica, alumina, titania, zirconia and mixtures thereof. Carriers comprising silica, zirconia and/or titania are especially preferred.

The catalytically active metal may be applied to the carrier by any of the techniques known in the art, for example comulling, impregnation, spray-coating or precipitation. Impregnation is a particularly preferred technique, in which the carrier is contacted with a compound of the catalytically active metal in the presence of a liquid, most conveniently in the form of a solution of the metal compound. The compound of the active metal may be inorganic or organic, with inorganic compounds being preferred, in particular nitrates. The liquid employed may also be either organic or inorganic. Water is a most convenient liquid. It will be appreciated that the water may, at least partly, be derived from crystal water which is liberated from the metal compound upon impregnation at elevated temperature.

The amount of catalytically active metal present on the carrier is typically in the range of from 1 to 100 parts by weight, preferably 10 to 50 parts by weight, per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB or VIIB of the Periodic Table, oxides of the lanthanides and/or the actinides. Preferably, the catalyst comprises at least one oxide of an element in Group IVB, VB and/or VIIB of the Periodic Table, in particular titanium, zirconium manganese and/or vanadium. Catalysts comprising zirconium are especially preferred. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and zirconium as a promoter. Another suitable catalyst comprises cobalt as the catalytically active metal and manganese or vanadium as a promoter. The promoter may be incorporated in the catalyst using any of the methods discussed hereinbefore with respect to the catalytically active component.

The promoter, if present in the catalyst, is typically present in an amount of from 1 to 60 parts by weight, preferably from 2 to 40 parts by weight, per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt: (manganese+vanadium) molar ratio is advantageously at least 12:1.

The hydrocarbon (Fischer-Tropsch) synthesis is conducted under conditions of elevated temperature and pressure. Typically, the synthesis is effected at a temperature in the range of from 125 to 300° C., preferably from 175 to 250° C. The reaction pressure is typically in the range of from 5 to 100 bar, preferably from 12 to 50 bar. The synthesis may be conducted using a variety of reactor types and reaction regimes, for example in a fixed bed regime, a slurry phase regime or an ebullating bed regime.

The hydrocarbon product of the Fischer-Tropsch synthesis process, containing wax, is then subjected to a hydrogenation treatment. the entire effluent of the synthesis process may be led directly to the hydrogenation treatment stage. However, it is preferred to separate from the hydrocarbon product of the synthesis stage the unconverted carbon monoxide and hydrogen and water formed during the synthesis. If desired, the low molecular weight products of the synthesis stage, in particular the $C_4-$ fraction, for example methane, ethane and propane, may also be removed prior to the hydrogenation treatment. The separation is conveniently effected using distillation techniques well known in the art. In another preferred embodiment, a wax fraction, typically boiling above 370° C. at atmospheric pressure, is separated from the hydrocarbon product of the Fischer-Tropsch process and subjected to the hydrogenation treatment.

The hydrogenation treatment is typically carried out in the presence of a hydrogenation catalyst and hydrogen at a temperature from 100 to 400° C., preferably from 100 to 300° C., more preferably, 150 to 275° C., even more preferably 180 to 250° C. Typically, a hydrogen partial pressure is applied in the range from 10 to 250 bar, preferably from 10 to 150 bar, more preferably from 10 to 50 bar, even more preferably from 15 to 45 bar. Hydrogen may be supplied to the hydrogenation treatment stage at a gas hourly space velocity in the range of from 100 to 10000 Nl/l reaction zone volume/hr, more preferably from 250 to 5000 Nl/l reaction zone volume/hr. The wax being treated is typically supplied to the hydrogenation treatment stage at a weight hourly space velocity in the range of from 0.1 to 5 kg/l reaction zone volume/hr, more preferably from 0.25 to 2.5 kg/l reaction zone/hr. The ratio of hydrogen to wax may range from 100 to 5000 Nl/kg and is preferably from 250 to 3000 Nl/kg.

Hydrogenation catalysts are known to those skilled in the art and available commercially, or may be prepared by methods well known in the art, for example the methods discussed hereinbefore with reference to the preparation of the hydrocarbon (Fischer-Tropsch) synthesis catalyst.

Typically, the hydrogenation catalyst comprises as catalytically active component one or more metals selected from Groups VIB and VIII of the Periodic Table of Elements, in particular one or more metals selected from molybdenum, tungsten, cobalt, nickel, ruthenium, iridium, osmium, platinum and palladium. Preferably, the catalyst comprises one or more metals selected from nickel, platinum and palladium as the catalytically active component.

A particularly suitable catalyst comprises nickel as a catalytically active component.

Catalysts for use in the hydrogenation treatment stage typically comprise a refractory metal oxide or silicate as a carrier. Suitable carrier materials include silica, alumina, silica-alumina, zirconia, titania and mixtures thereof. Preferred carrier materials for inclusion in the catalyst for use in the process of this invention are silica, alumina, silica-alumina, and diatomaceous earth (kieselguhr).

The catalyst may comprise the catalytically active component in an amount of from 0.05 to 80 parts by weight, preferably from 0.1 to 70 parts by weight, per 100 parts by weight of carrier material. The amount of catalytically active metal present in the catalyst will vary according to the specific metal concerned. One particularly suitable catalyst for use in the hydrogenation treatment stage comprises nickel in an amount in the range of from 30 to 70 parts by weight per 100 parts by weight of carrier material. A second particularly suitable catalyst comprises platinum in an amount in the range of from 0.05 to 2.0 parts by weight per 100 parts by weight of carrier material.

The hydrogenation treatment stage is preferably operated under conditions such that the product contains less than 1.0% by weight of oxygenates, more preferably less than 0.5% by weight, most preferably less than 200 ppm. It has surprisingly been found that waxes which have been produced by inter alia a hydrogenation treatment in which the oxygenates level has been reduced to the amounts given hereinabove have better properties, like better Saybolt colour, better Saybolt colour stability, better odour and/or less accumulation in Fischer 344 rats, than waxes which have been produced by a process wherein the hydrogenation treatment is carried out such that a hydrogenated wax fraction is produced having higher oxygenates levels, that is $\geq 1.5\%$ by weight.

The hydrogenated wax is subsequently fractionated to obtain a wax fraction having the desired congealing point. Preferably, the fractionation is carried out by short-path distillation apparatus, preferably, wiped film evaporators. The use of wiped film evaporators in fractionation of Fischer-Tropsch wax has been described in European Patent Application Publication No. 0 579 330.

The wax fraction so-obtained is then subjected to a hydrofinishing treatment. Preferably, the hydrofinishing treatment is carried out in the presence of a hydrofinishing catalyst and hydrogen at a temperature from 100 to 400° C., preferably 100 to 300° C., more preferably, 150 to 275° C., even more preferably 220 to 250° C.

In a preferred embodiment, the hydrofinishing treatment is carried out at a hydrogen partial pressure in the range of more than 50 to 250 bar, preferably in the range of more than 50 to 120 bar, more preferably from 60 to 110 bar, even more preferably from 75 to 95 bar. By applying a hydrogen partial pressure in the hydrofinishing treatment which is higher than the hydrogen partial pressure in the hydrogenation treatment, a wax is produced which has better properties, like better Saybolt colour, better Saybolt colour stability, better odour and/or less accumulation in Fischer 344 rats. Hydrogen may be supplied to the hydrofinishing treatment stage at a gas hourly space velocity in the range of from 100 to 10000 Nl/l reaction zone volume/hr, more preferably from 250 to 5000 Nl/l reaction zone volume/hr. The wax being treated is typically supplied to the hydrofinishing treatment stage at a weight hourly space velocity in the range of from 0.1 to 5 kg/l reaction zone volume/hr, more preferably from 0.25 to 2.5 kg/l reaction zone volume/hr.

Suitable hydrofinishing catalysts are known to those skilled in the art and available commercially, or may be prepared by methods well known in the art, for example the methods discussed hereinbefore with reference to the preparation of the hydrocarbon (Fischer-Tropsch) synthesis catalyst.

Typically, the hydrofinishing catalyst comprises as catalytically active component one or more metals selected from Groups VIB and VIII of the Periodic Table of Elements, in particular one or more metals selected from molybdenum, tungsten, cobalt, nickel, ruthenium, iridium, osmium, platinum and palladium. Preferably, the catalyst comprises one or more metals selected from nickel, platinum and palladium as the catalytically active component.

A particularly suitable catalyst comprises nickel as a catalytically active component.

Catalysts for use in the hydrofinishing treatment stage typically comprise a refractory metal oxide or silicate as a carrier. Suitable carrier materials include silica, alumina, silica-alumina, zirconia, titania and mixtures thereof. Preferred carrier materials for inclusion in the catalyst for use in the process of this invention are silica, alumina, silica-alumina, and diatomaceous earth (kieselguhr).

The catalyst may comprise the catalytically active component in an amount of from 0.05 to 80 parts by weight, preferably from 0.1 to 70 parts by weight, per 100 parts by weight of carrier material. The amount of catalytically active metal present in the catalyst will vary according to the specific metal concerned. One particularly suitable catalyst for use in the hydrofinishing treatment stage comprises nickel in an amount in the range of from 30 to 70 parts by weight per 100 parts by weight of carrier material. A second particularly suitable catalyst comprises platinum in an amount in the range of from 0.05 to 2.0 parts by weight per 100 parts by weight of carrier material.

The hydrogen to be used in the hydrogenation and hydrofinishing treatments of the process of the present invention may be diluted with other gases. Typically, the gas to be fed to the hydrofinishing and hydrotreatment stages contains at least 70% by volume of hydrogen.

The present invention further relates to a wax as described hereinbefore. In particular, the present invention relates to a wax having a congealing point in the range of from 85 to 150° C., a Saybolt colour of more than +25, preferably at least +28, more preferably at least +30, and which wax has an accumulation in the liver of female Fischer 344 rats of less than 10% by weight relative to a control group of female Fischer 344 rats.

The present invention will now be described further by means of the following Examples, which have been included for illustrative purposes only and are not to be construed as limiting the invention.

EXAMPLE I

A wax suitable for food applications was prepared by subjecting a wax prepared in a Fischer-Tropsch synthesis process to a hydrogenation treatment, using a fixed bed of a commercially available nickel/kieselguhr catalyst containing about 60% by weight of nickel. The conditions applied during the hydrogenation treatment were as follows.

WHSV: 1.0 kg/l/h
Temp.: 220° C.
$P_{H2}$: 30 bar abs.
GHSV: 1000 Nl/l/h

The hydrogenated product contained about 0.16% by weight of oxygenates. The hydrogenated product was subsequently fractionated, using wiped film evaporators, and a hydrogenated wax fraction was obtained having a congealing point in the range from 90–100° C.

The hydrogenated wax fraction was subjected to a hydrofinishing treatment, using a fixed bed of a commercially available nickel/kieselguhr catalyst, containing about 60% by weight of nickel. Typically, the hydrofinishing conditions were as follows.

WHSV: 0.4 kg/l/h
Temp.: 240° C.
$P_{H2}$: 90 bar abs.
GHSV: 1000 Nl/l/h

The hydrofinished wax product had a congealing point of 93° C. and a Saybolt colour of greater than +30.

The following experiment demonstrates the importance of reducing the amount of oxygenates in the hydrogenation step to a sufficiently low level for reaching high Saybolt colour levels.

A wax prepared in a Fischer-Tropsch synthesis process, essentially the same as used above, but containing more oxygenates, was subjected to a hydrogenation treatment under the same conditions as applied in the experiment described above. The hydrogenated product contained more than 2% by weight of oxygenates.

A hydrofinished wax fraction was prepared in the same way as described above. The hydrofinished wax fraction had a Saybolt colour of only +20. More severe hydrofinishing treatments did not result in an improvement of Saybolt colour to +25 or greater.

EXAMPLE II

A wax was prepared by subjecting a wax prepared in a Fischer-Tropsch synthesis process to a hydrogenation treatment, fractionation, using wiped film evaporators, to obtain a hydrogenated wax fraction having a congealing point of about 90 to 100, and subjecting the wax fraction to a hydrofinishing treatment, in the way as described hereinabove. Properties of the wax so-produced have been listed in Table I.

TABLE I

| Property | Wax | Method |
|---|---|---|
| Congealing point | 93 | ASTM D938 |
| Saybolt Colour | +30 | ASTM D156 |
| Odour | 0.5 | ASTM D1833 |
| Oil content @ −32° C. | 0.0 | ASTM D721 |
| UV Adsorptivity | <0.01 | ASTM D2008 |

Feeding Study with Fischer 344 Rats

Groups of female Fischer 344 rats were fed daily with diets supplemented with powdered wax for 90 days. Wax concentrations tested were 0.002, 0.02, 0.2 and 2% by weight and there were five animals per dose group. A control group of five animals received diet only. The study was conducted according to good laboratory procedures and as far as appropriate, to the conditions laid down in the FDA red-book for food additives.

Food intakes, body weight changes and clinical signs were monitored periodically throughout the study. At termination, spleen, thymus, mesenteric lymph nodes, liver and kidney were weighed and a histological examination of liver, mesenteric lymph nodes, thymus, heart and spleen was conducted.

All animals fed with diets containing wax gained weight, as did control animals, throughout the study. There were no deaths and no adverse clinical findings.

There were no treatment-related effects on organ weights at termination in animals fed wax. Accordingly, the wax had not accumulated in the animals.

Some histiocytosis was seen in mesenteric lymph nodes of some wax-treated animals but this was not dose-related and it was also present in control animals. Consequently, this was considered to be unrelated to treatment.

We claim:

1. A process for the preparation of wax for food applications which comprises reacting hydrogen and carbon monoxide by Fischer-Tropsch synthesis under conditions effective to attain a hydrocarbon product containing wax having a congealing point of more than 65° C. and a Saybolt color of more than +25, recovering the wax, hydrogenating the wax under conditions effective to attain a hydrogenated wax having less than 1.5% by weight oxygenates, fractionating the hydrogenated wax under conditions effective to recover a hydrogenated wax having a desired congealing point, hydrofinishing the recovered portion of the hydrogenated wax, and using the hydrofinished wax in food applications.

2. The process of claim 1 wherein the wax has a congealing point of greater than 75° C.

3. The process of claim 1 wherein the wax has a congealing point of more than 95° C.

4. The process of claim 1 wherein the wax has a congealing point of up to 150° C.

5. The process of claim 1 wherein the wax has a Saybolt color of at least +30.

6. The process of claim 1 wherein the hydrogenation is effected in the presence of a hydrogenation catalyst and hydrogen at a temperature of from 100° C. to 400° C.

7. The process of claim 6 wherein the hydrogenation is effected at a hydrogen partial pressure in the range of from 10 to 250 bar.

8. The process of claim 7 wherein the hydrofinishing is effected at a hydrogen partial pressure which is greater than the hydrogen partial pressure in the hydrogenation treatment.

9. The process of claim 1 wherein the fractionation is carried out by short-path distillation apparatus.

10. The process of claim 9 wherein the short-path distillation apparatus is wiped film evaporators.

11. The process of claim 1 wherein the hydrofinishing is effected in the presence of a hydrofinishing catalyst and hydrogen at a temperature from 100° C. to 400° C.

12. The process of claim 11 wherein the hydrofinishing is effected at a hydrogen partial pressure in the range of more than 50 to 250 bar.

13. The process of claim 1 wherein the wax used in food applications comes into direct contact with food suitable for human consumption.

14. The process of claim 1 wherein the wax used in direct contact with food suitable for human consumption has a congealing point of more than 65° C.; a Saybolt color of at least +30 and when clinically tested in male Fischer 344 rats has an accumulation of less than 10% by weight in the liver of said rats.

* * * * *